G. S. McGEE.
POTATO DIGGER.
APPLICATION FILED MAY 21, 1912.
1,059,551.
Patented Apr. 22, 1913.
2 SHEETS—SHEET 1.
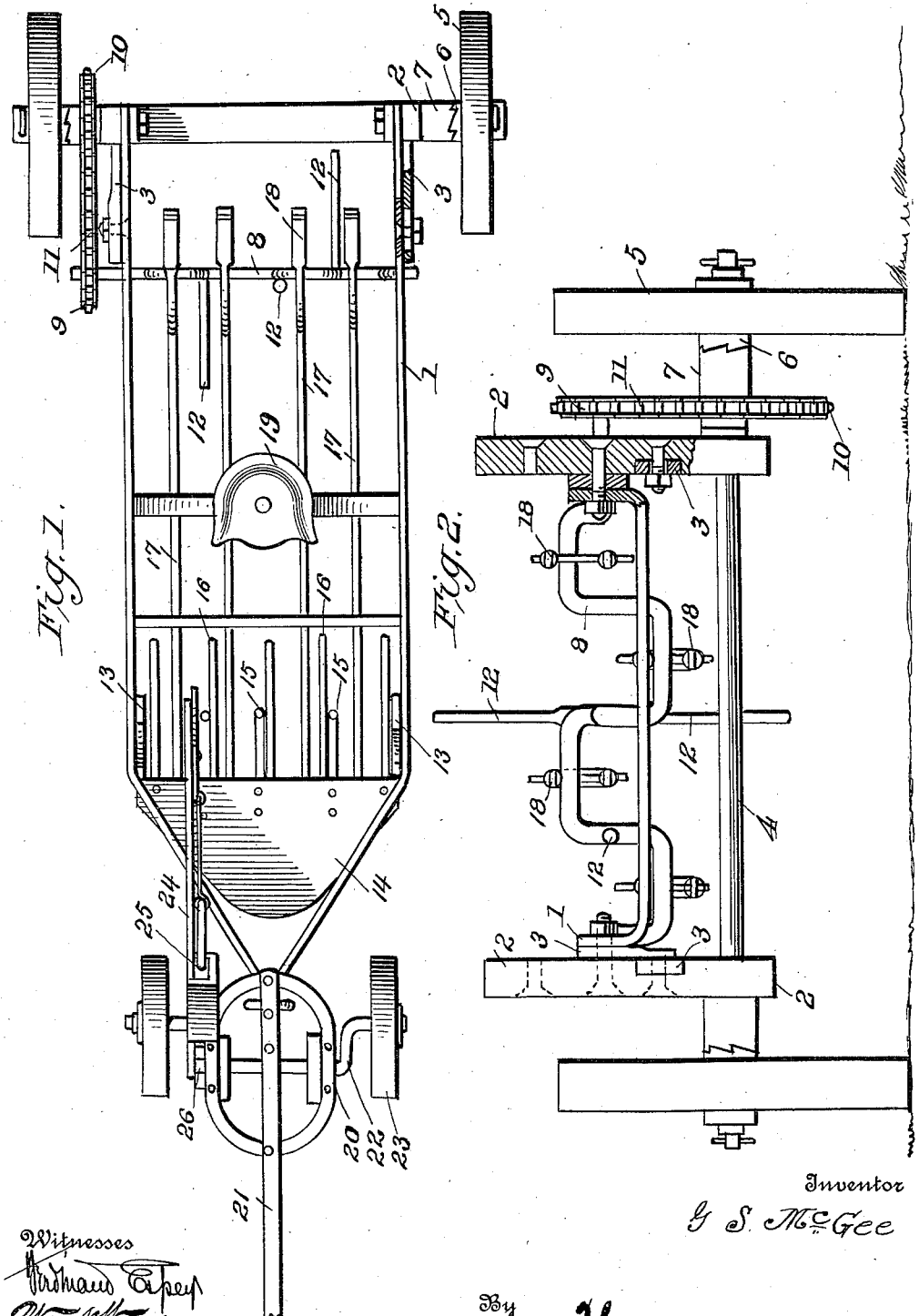
Inventor
G. S. McGee
Witnesses
By
Attorneys

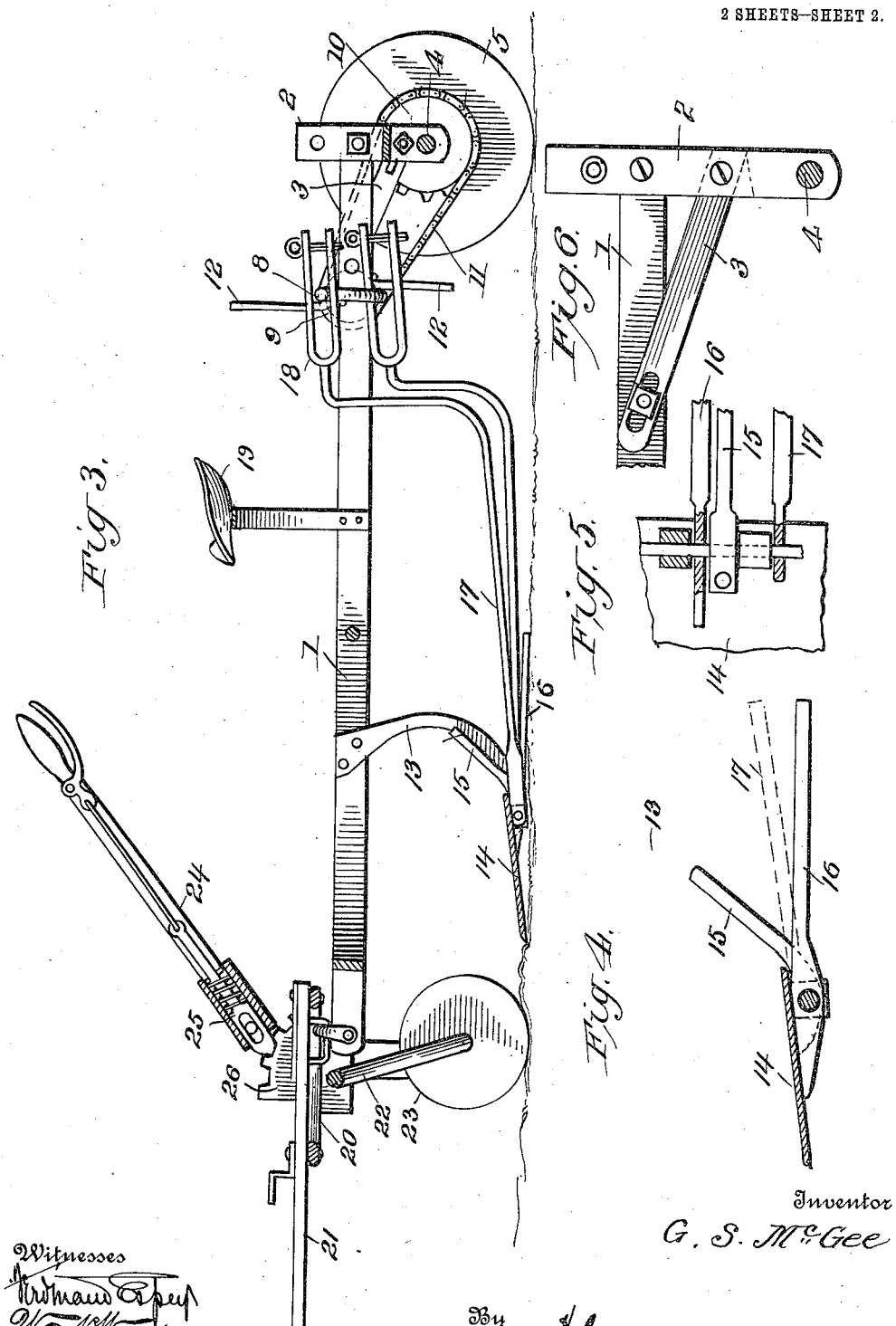

UNITED STATES PATENT OFFICE.

GILBERT S. McGEE, OF POWELL, SOUTH DAKOTA, ASSIGNOR TO L. A. McGEE, OF POWELL, SOUTH DAKOTA.

POTATO-DIGGER.

1,059,551.   Specification of Letters Patent.   Patented Apr. 22, 1913.

Application filed May 21, 1912. Serial No. 698,787.

*To all whom it may concern:*

Be it known that I, GILBERT S. McGEE, a citizen of the United States, residing at Powell, in the county of Stanley and State of South Dakota, have invented certain new and useful Improvements in Potato-Diggers, of which the following is a specification.

This invention relates to potato diggers and has for its object to provide a machine of simple structure adapted to dig the potatoes from the ground and elevate the same to the surface of the soil and remove the vines from the potatoes so elevated.

With the above object in view the machine includes a wheel mounted frame with means for raising and lowering the frame upon its supporting wheels. A share is carried at the forward part of the frame and is provided at its rear edge with a series of fixed bars, a series of short pivoted bars, and a series of long pivoted bars. A crank shaft is journaled at the rear portion of the frame and is adapted to be operated from one of the supporting wheels. The long pivoted bars are provided at their rear ends with loops which receive the cranks of the said shaft, whereby the rear portions of the bars are moved vertically as the shaft rotates.

For a full understanding of the invention, reference is to be had to the following description and accompanying drawings in which:

Figure 1 is a top plan view of the potato digger; Fig. 2 is a rear end view of the same with parts in section; Fig. 3 is a longitudinal sectional view of the same; Fig. 4 is a detail sectional view through the share of the same; Fig. 5 is an under view of part of the share showing parts in section; Fig. 6 is a detail side elevation of parts of the digger.

Corresponding and like parts are referred to in the following description and indicated in all the views of the accompanying drawings by the same reference characters.

The digger includes a frame 1 which is provided at its rear end with adjustable standards 2. Braces 3 are pivotally connected with the standards 2 and are adjustably connected with the sides of the frame 1. An axle 4 is carried at the lower end portions of the standards 2, and wheels 5 are journaled upon the end portions of the axle. These wheels are provided with clutch hubs 6 which are adapted to coöperate with clutch members 7 mounted upon the axle 2 so that when the wheels 5 rotate in a forward direction rotary movement is transmitted to the clutch members 7. The crank shaft 8 is journaled upon the rear part of the frame 1 and is provided at one end with a sprocket wheel 9. One of the clutch members 7 is provided with a sprocket wheel 10, and a sprocket chain 11 is trained around the wheels 9 and 10.

Radially disposed arms 12 are carried by the crank shaft 8. Standards 13 depend from the forward part of the frame 1 and carry at their lower ends a share 14. Relatively short bars 15 are fixed to the rear part of the share 14 and extend upwardly from the rear edge thereof. Relatively short bars 16 are pivotally connected at their forward ends with the share 14 and are adapted to trail along the soil. Relatively long bars 17 are pivotally connected at their forward ends with the share 14, and these bars are provided at their rear ends with loops 18 which receive the cranks of the shaft 8. An operator's seat 19 is mounted upon the frame 1.

The forward end of the frame 1 is supported upon a truck 20, which in turn is provided with a tongue 21. The forward part of the frame 1 is pivotally connected with the said truck and means are provided for swinging the wheels under the forward part of the frame so that the said frame may be raised or lowered at its forward end. The truck 20 includes an arch axle 22 to the ends of which wheels 23 are journaled. A lever 24 is fixed to the arch axle 22 and carries a spring pawl 25 which is adapted to engage the teeth of a segment 26 mounted upon the frame of the truck 20. Therefore it will be seen that by swinging the lever 24 the wheels 23 are moved under the truck and the forward part of the frame 1 may be raised or lowered and secured at an adjusted position.

In operation the forward part of the frame 1 is lowered and the machine is drawn along the row of potatoes. The share 14 cuts into the soil below the potatoes, and as the material moves back over the bars 15 the potatoes and vines are lifted. The potatoes and vines then fall upon the bars 16 and 17, and by reason of the fact that these bars are pivoted the soil is sifted from the potatoes.

The potatoes move back along the bars 16, and the arms 12 rotating about the axis of the shaft 8 strike the vines and tear the vines from the potatoes. After this is done the vines and potatoes are deposited at the surface of the soil and the potatoes may be subsequently collected.

Having described the invention, what is claimed as new is:

1. A potato digger comprising a frame, a share carried by the frame, relatively short bars fixed to the share and extending upwardly and rearwardly therefrom, relatively short bars pivoted to the rear part of the share, and relatively long bars pivoted to the rear part of the share.

2. A potato digger comprising a frame, a share attached thereto, relatively short bars fixed to the share and extending upwardly and rearwardly therefrom, relatively short bars pivoted to the share, relatively long bars pivoted to the share, and means for swinging the long bars vertically.

3. A potato digger comprising a wheel mounted frame, a share carried by the frame, relatively short bars fixed to the share and extending upwardly and rearwardly therefrom, relatively short bars pivoted to the share, relatively long bars pivoted to the share and having loops, and a shaft journaled upon the frame and having cranks received within the loops.

4. A potato digger comprising a frame, a share carried thereby, upwardly and rearwardly disposed bars carried by the share, bars pivoted to the share and provided at their rear ends with loops, a crank shaft journaled upon the frame and having its cranks received within the loops, and means for rotating the crank shaft.

5. A potato digger comprising a wheel mounted frame, a share carried thereby, bars pivoted at their forward ends to the share, a crank shaft journaled upon the frame, means for rotating the crank shaft, said bars having at their rear ends loops which receive the cranks of the shaft, and arms carried by the shaft and adapted to operate between the said bars.

In testimony whereof I affix my signature in presence of two witnesses.

GILBERT S. McGEE. [L. S.]

Witnesses:
H. H. HAMLIN,
J. A. CURINGTON.

Copies of this patent may be obtained for five cents each, by addressing the "Commissioner of Patents, Washington, D. C."